(12) United States Patent
Childress et al.

(10) Patent No.: US 11,089,013 B2
(45) Date of Patent: Aug. 10, 2021

(54) ENHANCED PASSWORD AUTHENTICATION ACROSS MULTIPLE SYSTEMS AND USER IDENTIFICATIONS

(71) Applicant: INTERNATIONAL BUSINESS MACHINES CORPORATION, Armonk, NY (US)

(72) Inventors: Rhonda L. Childress, Austin, TX (US); John R. Feezell, Pikeville, TN (US); Cesar Augusto Rodriguez Bravo, Alajuela (CR)

(73) Assignee: International Business Machines Corporation, Armonk, NY (US)

(*) Notice: Subject to any disclaimer, the term of this patent is extended or adjusted under 35 U.S.C. 154(b) by 223 days.

(21) Appl. No.: 16/131,885

(22) Filed: Sep. 14, 2018

(65) Prior Publication Data
US 2020/0092282 A1 Mar. 19, 2020

(51) Int. Cl.
*H04L 29/06* (2006.01)
*G06F 21/45* (2013.01)
(Continued)

(52) U.S. Cl.
CPC ........ *H04L 63/0853* (2013.01); *G06F 9/4411* (2013.01); *G06F 21/32* (2013.01); *G06F 21/45* (2013.01); *H04L 63/083* (2013.01)

(58) Field of Classification Search
CPC ................................................. H04L 63/0853
See application file for complete search history.

(56) References Cited

U.S. PATENT DOCUMENTS 5,484,174 A 1/1996 Gotoh et al.
7,907,542 B2 3/2011 Smith
(Continued)

FOREIGN PATENT DOCUMENTS

CN 2667807 Y 12/2004
CN 101150409 A 3/2008
(Continued)

OTHER PUBLICATIONS

Adam, "Log Computer and User Names—Logon Script," Spiceworks Script Center, Sep. 18, 2009, p. 1-4, https://community.spiceworks.com/scripts/show/86-log-computer-and-user-names-logon-script, Accessed on Sep. 13, 2018.
(Continued)

*Primary Examiner* — Simon P Kanaan
(74) *Attorney, Agent, or Firm* — Rakesh Roy

(57) ABSTRACT

A method, computer system, and a computer program product for enhanced user authentication is provided. The present invention may include obtaining, from a user device, a user name associated with the user device. The present invention may also include obtaining, from the user device, a system name associated with the user device. The present invention may then include identifying, in a database of a security device in communication with the user device, a password associated with the obtained user name and the obtained system name. The present invention may then include, in response to a login prompt of the user device, automatically injecting the identified password from the security device in communication with the user device into the login prompt.

20 Claims, 9 Drawing Sheets

(51) Int. Cl.
*G06F 9/4401* (2018.01)
*G06F 21/32* (2013.01)

(56) References Cited

U.S. PATENT DOCUMENTS

| | | | |
|---|---|---|---|
| 8,090,945 B2 | 1/2012 | Singhal | |
| 8,171,531 B2 | 5/2012 | Buer | |
| 8,214,888 B2 | 7/2012 | Noe et al. | |
| 8,224,293 B1 | 7/2012 | Knapp et al. | |
| 8,245,292 B2 | 8/2012 | Buer | |
| 8,307,412 B2 | 11/2012 | Ozzie et al. | |
| 8,370,640 B2 | 2/2013 | Adams et al. | |
| 8,386,795 B2 | 2/2013 | Lu et al. | |
| 8,812,864 B2 | 8/2014 | Adams et al. | |
| 8,904,186 B2 | 12/2014 | Smith et al. | |
| 8,910,274 B2 | 12/2014 | Sanders | |
| 9,424,575 B2 | 8/2016 | Grigg et al. | |
| 9,848,324 B1* | 12/2017 | Abene | G06F 21/35 |
| 2006/0230286 A1 | 10/2006 | Kitada | |
| 2007/0101152 A1 | 5/2007 | Mercredi et al. | |
| 2007/0107050 A1 | 5/2007 | Selvarajan | |
| 2008/0109895 A1 | 5/2008 | Janevski | |
| 2008/0148057 A1 | 6/2008 | Hauw | |
| 2010/0174913 A1 | 7/2010 | Johnson et al. | |
| 2013/0031623 A1 | 1/2013 | Sanders | |
| 2014/0096212 A1 | 4/2014 | Smith et al. | |
| 2014/0189808 A1* | 7/2014 | Mahaffey | H04L 63/0853 726/4 |
| 2016/0197919 A1 | 7/2016 | Senthurpandi | |
| 2016/0285633 A1* | 9/2016 | Allinson | G06F 21/34 |
| 2019/0163893 A1* | 5/2019 | Rodriguez Bravo | H04W 12/0608 |

FOREIGN PATENT DOCUMENTS

| | | |
|---|---|---|
| CN | 100576798 C | 12/2009 |
| CN | 104021332 A | 9/2014 |
| CN | 105187217 A | 12/2015 |

OTHER PUBLICATIONS

De Ru et al., "Enhanced Password Authentication through Fuzzy Logic," IEEE Expert, Nov./Dec. 1997, p. 38-45, vol. 12, Issue 6.
Gemalto, "SafeNet Authentication Manager," Product Brief, Jun. 12, 2017, p. 1-2.
HID, "HID on the Desktop™ Security Overview," Technology Basics White Paper, 2008, p. 1-9, HID Global, Assa Abloy.
HID, "naviGO™ Software," HID Identity Assurance Solutions, 2013, 4 Pages, HID Global, Assa Abloy.
Huang et al., "How to Check Computer Name at Login Screen," TechNet, May 9, 2011, p. 1-5, https://social.technet.microsoft.com/Forums/windows/en-US/89f7e821-2813-4fde-83b3-b86063346355/how-to-check-computer-name-at-login-screen?forum=w7itpronetworking, Accessed on Sep. 13, 2018.
Kingston, "Encrypted USB Flash Drives," Kingston Encrypted Security, p. 1-3, Kingston Technology Corporation, https://www.kingston.com/us/usb/encrypted_security, Accessed on Sep. 13, 2018.
Kishore, "Find and Change Your Hostname in Ubuntu," Help Desk Geek, Jan. 11, 2018, p. 1-5, Help Desk Geek.com, LLC, https://helpdeskgeek.com/linux-tips/find-and-change-your-hostname-in-ubuntu/, Accessed on Sep. 13, 2018.
Mell et al., "The NIST Definition of Cloud Computing," National Institute of Standards and Technology, Sep. 2011, p. 1-3, Special Publication 800-145.
Meltemi et al., "View Machine Name on Login Screen," Ask Different, Nov. 9, 2014, p. 1-2, https://apple.stackexchange.com/questions/155429/view-machine-name-on-login-screen, Accessed on Sep. 13, 2018.
Rahul et al., "How to Display the Hostname Name in Screen when you ssh into Remote System?," Stack Overflow, Jan. 25, 2012, p. 1-3, Stack Exchange Inc., https://stackoverflow.com/questions/8999060/how-to-display-the-hostname-name-in-screen-when-you-ssh-into-remote-system, Accessed on Sep. 13, 2018.
Ridge et al., "Passing a Computer Name and Username into a Batch Script," Stack Overflow, Aug. 16, 2011, p. 1-2, Stack Exchange Inc., https://stackoverflow.com/questions/7082484/passing-a-computer-name-and-username-into-a-batch-script, Accessed on Sep. 13, 2018.
Stewart et al., "VBS Script to Get Computer Name," TechNet, Jul. 31, 2012, p. 1-6, https://social.technet.microsoft.com/Forums/scriptcenter/en-US/b5568c26-3ed0-4cbe-bc1f-9e6ae8281aa5/vbs-script-to-get-computer-name?forum=ITCG, Accessed on Sep. 13, 2018.
Van Der Woude, "Retrieving the Computer Name," VBScript Scripting Techniques, Last Updated Jul. 6, 2017, p. 1-5, http://www.robvanderwoude.com/vbstech_network_names_computer.php, Accessed on Sep. 13, 2018.

* cited by examiner

ENHANCED PASSWORD AUTHENTICATION ACROSS MULTIPLE SYSTEMS AND USER IDENTIFICATIONS

BACKGROUND

The present invention relates generally to the field of computing, and more particularly to authentication technology.

Passwords are a popular method for authentication. Despite the potential vulnerabilities of weak passwords, the most predictable passwords (e.g., "12345," "password") are often the most implemented passwords. Other existing authentication solutions, such as biometric devices, smart cards, and multi-factor authentication are not widely adopted due to the cost of implementation and required proprietary software. Further, most of the existing security products and solutions are only targeted for use with applications and web services, and lack functionality at the operating system level. There is no single solution to meet the secure authentication needs at every level.

SUMMARY

Embodiments of the present invention disclose a method, computer system, and a computer program product for an enhanced user authentication. The present invention may include obtaining, from a user device, a user name associated with the user device. The present invention may also include obtaining, from the user device, a system name associated with the user device. The present invention may then include identifying, in a database of a security device in communication with the user device, a password associated with the obtained user name and the obtained system name. The present invention may then include, in response to a login prompt of the user device, automatically injecting the identified password from the security device in communication with the user device into the login prompt.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
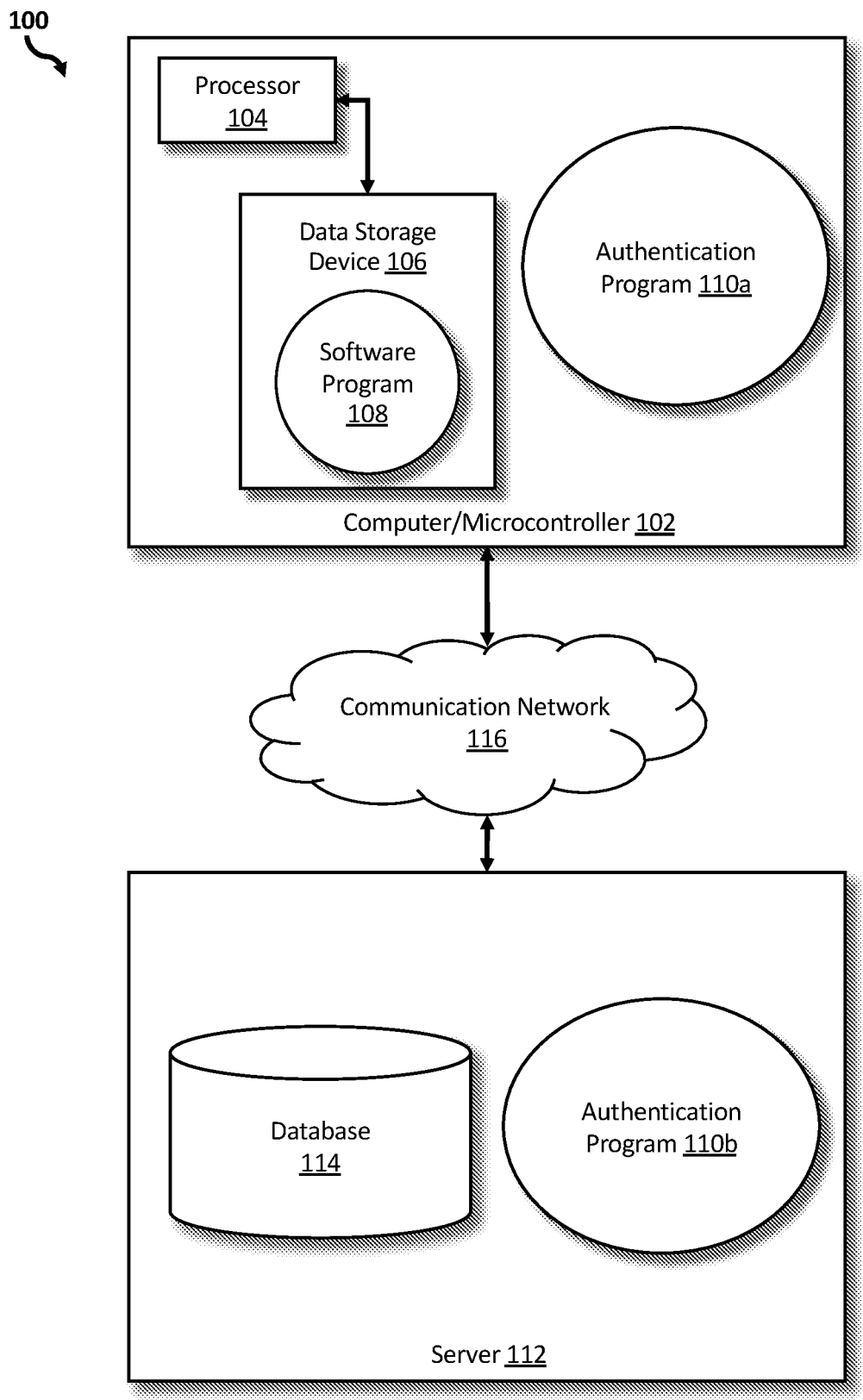
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for enhanced user authentication across multiple systems and multiple user identifications (IDs) associated with a user. As such, the present embodiment has the capacity to improve the technical field of authentication technology by providing an external security device running an authentication program for securely authenticating a user across multiple systems and multiple user IDs associated with the user, without required proprietary software on a user device. More specifically, the security device may include one or more Universal Serial Bus human interface device class (USB HID) drivers for interfacing with one or more generic USB HID drivers found in most operating systems. Further, the security device may include a credential storage matrix for storing multiple user ID/password pairings for multiple systems. The authentication program running on the security device may implement the security device to automatically inject a password selected from the credential storage matrix into a password field during a login sequence of the user device.

As described previously, passwords are the most popular method for authentication. Despite the potential vulnerabilities of weak passwords, the most predictable passwords (e.g., "12345," "password") are often the most implemented passwords. As the availability of cheap, readily available computation power increases exponentially, security experts recommend the use of more complex passwords in order to avoid (or at least delay) password compromise. However, for many users, meeting the recommended password criteria is difficult. As such, many users rely on predictable/weak passwords, write the passwords down, and use the same user IDs/passwords across multiple systems (e.g., domains, websites). Management of password criteria is even more onerous for system administrators who are tasked with managing hundreds of servers across multiple domains, where non-compliance may lead to major security risks.

Other existing authentication solutions, such as biometric devices (e.g., finger print readers), smart cards, and multi-factor authentication are not widely adopted due to the cost of implementation, the required proprietary software, and demonstrated security concerns. For example, many hacker communities have demonstrated different techniques for bypassing finger print readers. Further, most of the existing security products and solutions are only targeted for use with applications and web services, and lack functionality at the operating system level. There is no single solution to meet the secure authentication needs at every level.

Therefore, it may be advantageous to, among other things, provide a way for simple, secure, multi-account, multi-server authentication using a security device that may interface as a keyboard with any system without required proprietary software.

According to at least one embodiment, the security device may include a USB HID device. The USB HID device may interface across all systems using generic HID keyboard drivers which are loaded by default in all operating systems (OS). The USB HID device may automatically inject the password into any system, including, but not limited to, OS, web/cloud applications, databases, remote connections (e.g., putty, remote desktop protocol), systems, applications, and point of sale systems. In one embodiment, the USB HID device may support local OS authentication for devices that may not be on a network connected to a cloud environment.

According to another embodiment, the present disclosure may provide multi-factor authentication including the security device (e.g., USB HID device), a secure personal identification number (PIN) appended to the automatically injected password, and biometric authentication (e.g., fingerprint, facial recognition, palm print, iris recognition) using an onboard biometric scanner on the security device. The present disclosure may provide security against common malicious attacks, including keylogger attacks, brute force attacks, and dictionary attacks. According to another embodiment, the present disclosure may be open to any platform.

According to another embodiment, the USB HID device may include code (e.g., firmware/software) for a matrix recording user name/password/server name combinations. In one embodiment, the USB HID device may be connected to the computer after a login screen is available, the user name has been manually entered by the user, and the prompt is in the password field. In one embodiment, the code of the USB HID device may associate both the server name (automatically obtained from the computer) and the user name (as manually typed in a user name field) with a password that matches the user name/server name combination. In one embodiment, the code of the USB HID device may then inject the password in the password field.

According to at least one embodiment, the user may approach a login prompt. Then, the user may manually type in the user ID and tab or mouse click down to the password field. Next, the user may plug in the USB HID device into a standard USB port of the user device such that the USB HID device is energized. In one embodiment, a script, having power and fingerprint authentication, may query the system for the server name. Then, a script may obtain the server name and cross reference an onboard storage matrix to associate the user ID and the server name with the proper password. Next, a script may inject the proper password which may be received by the system, identical to manual entry using a USB keyboard. In another embodiment, the user may append an optional alpha-numeric PIN to the newly injected password string to complete the required password. Thereafter, the user may interact with the user device, as appropriate, to execute the login.

Referring to FIG. 1, an exemplary networked computer environment 100 in accordance with one embodiment is depicted. The networked computer environment 100 may include a computer/microcontroller 102 with a processor 104 and a data storage device 106 that is enabled to run a software program 108 and an authentication program 110a. The networked computer environment 100 may also include a server 112 that is enabled to run an authentication program 110b that may interact with a database 114 and a communication network 116. The networked computer environment 100 may include a plurality of computers/microcontrollers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer/microcontroller 102 may communicate with the server computer 112 via the communications network 116. The communications network 116 may include connections, such as wire, wireless communication links, or fiber optic cables. As will be discussed with reference to FIG. 7, server computer 112 may include internal components 902a and external components 904a, respectively, and client computer/microcontroller 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a microcontroller, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the authentication program 110a, 110b may interact with a database 114 that may be embedded in various storage devices, such as, but not limited to a computer/mobile device 102, a networked server 112, or a cloud storage service.

According to the present embodiment, a user using a security device may gain authorized access to a client computer/microcontroller 102 or a server computer 112 across multiple systems and multiple user IDs associated with the user. An authentication method using the security device is explained in more detail below with respect to FIGS. 2 to 6.

Figure 2:
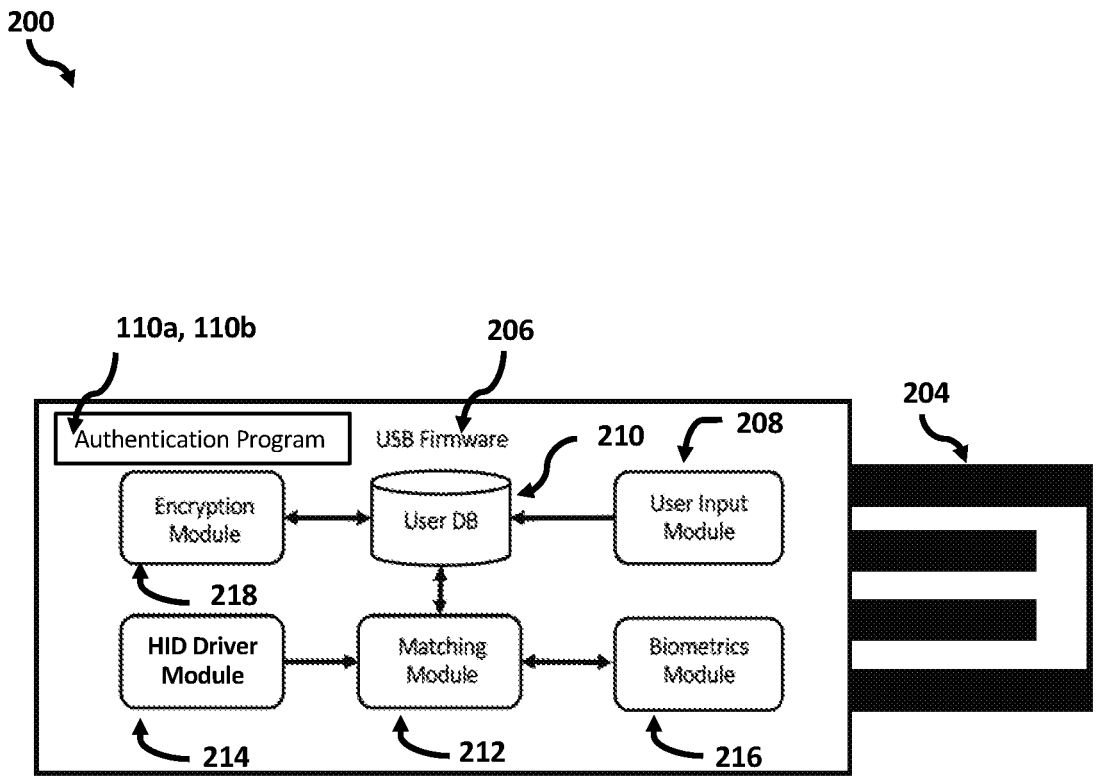
FIG. 2 is an exemplary illustration of a security device according to at least one embodiment.

Referring now to FIG. 2, an exemplary illustration of a USB HID device 200 (e.g., security device) in accordance with one embodiment is depicted.

In one embodiment, the computer system may include a special purpose computer or microcontroller, such as a USB HID device 200 (e.g., client computer/microcontroller 102), provided and configured for gaining authorized access to one or more user devices (e.g., client computer 102) across multiple systems (e.g., machines, servers, domains) and multiple user IDs (e.g., user names) associated with the user.

According to one embodiment, a USB HID device 200 (e.g., security device) may be provided as an external device and may include a plug 204 configured for connecting the USB HID device 200 to the user device. In one embodiment, the plug 204 may include a standard USB type-A plug. In other embodiments, the plug 204 may include a USB mini, a USB micro, or a USB type-C plug.

The USB HID device 200 may include a USB firmware 206. In one embodiment, the USB firmware 206 may include the authentication program 110a, 110b, similar to the authentication program 110a, 110b depicted in FIG. 1. The authentication program 110a, 110b running in the USB firmware 206 may control various components of the USB HID device 200 including, for example, a user input module 208, a user database (DB) 210, a matching module 212, a HID driver module 214, a biometrics module 216, and an encryption module 218. The USB firmware 206, the authentication program 110a, 110b, and the various modules may be loaded onto one or more microcontrollers of the USB HID device 200.

The authentication program 110a, 110b may implement the user input module 208 to store/update one or more user credentials on the user database 210. As will be further detailed with reference to FIGS. 3 and 4, a user, using a software program 108 on the user device, may initialize a new user profile. When the USB HID device 200 is connected to the user device, the authentication program 110a, 110b of the USB HID device 200 may receive one or more new user profile credentials collected via the user device. Specifically, the authentication program 110a, 110b may implement the user input module 208 to store the user profile credentials, received via the user device, in the user database 210 of the USB HID device 200. It is contemplated that the user database 210 may store multiple user profile credentials across multiple systems associated with the user so that the user may use a single USB HID device 200 to securely access various systems associated with the user. In one embodiment, the user database 210 of the USB HID device 200 may provide an onboard credential storage matrix for storing/recording the user name/system name/password combinations received from the user input module 208, as depicted, for example, in Table 1 below:

TABLE 1

| username | Password | systemname |
|---|---|---|
| admin | 8xKrhYzs*0uCo1J | abcd001 |
| root | m$4n!B@5$eOyTW* | abcd002 |
| Administrator | J4p^YkH@JZXcGaU | xyzw987 |

In one example, with the user database 210 storing the credential storage matrix (e.g., Table 1) above, the user may gain authorized access to three systems (e.g., "abcd001," "abcd002," "xyzw987") associated with the user using the same USB HID device 200. In one embodiment, the authentication program 110a, 110b of the USB HID device 200 may implement the encryption module 218 for encrypting/decrypting the data (e.g., user profile credentials) stored in the user database 210.

The authentication program 110a, 110b of the USB HID device 200 may implement the matching module 212 to read or parse through the credential storage matrix in the user database 210 to identify a password associated with the user name and the system name recorded in the credential storage matrix. As will be further detailed with reference to FIGS. 5 and 6, with the USB HID device 200 connected to the user device, the authentication program 110a, 110b of the USB HID device 200 may provide the matching module 212 to obtain a user name and a system name from the user device. Thereafter, the authentication program 110a, 110b may provide the matching module 212 to identify the associated password in the credential storage matrix (e.g., Table 1) of the user database 210.

When the USB HID device 200 is connected to the user device, it is contemplated that the USB HID device 200 may be automatically recognized (e.g., plug and play) by the user device without additional proprietary drivers or software. Specifically, the authentication program 110a, 110b of the USB HID device 200 may implement the HID driver module 214 to load one or more USB HID drivers when the USB HID device 200 is connected to the user device. The USB HID drivers of the HID driver module 214 may communicate with one or more generic HID drivers running on the user device to enable the user device to identify the USB HID device 200. In one embodiment, as a result of the interaction between USB HID drivers of the USB HID device 200 and the generic HID drivers running on the user device, the USB HID device 200 may register as a keyboard of the user device. In one embodiment, the authentication program 110a, 110b may provide the HID driver module 214 to automatically inject (e.g., as a keystroke payload) the password identified by the matching module 212 into a password text field during a login sequence in the user device, as will be detailed with reference to FIGS. 5 and 6.

In one embodiment, the authentication program 110a, 110b of the USB HID device 200 may implement the biometrics module 216 to provide an optional biometric authentication requirement (e.g., fingerprint) for use of the USB HID device 200, as will be detailed with reference to FIGS. 5 and 6. With the biometric authentication requirement enabled in the USB HID device 200 for an authorized user, it is contemplated that an unauthorized user (e.g., with an unauthorized fingerprint) may be unable to interface the USB HID device 200 with a user device for injecting passwords associated with the user credentials of an authorized user.

In one embodiment, the USB HID device 200 may include an onboard biometrics scanner (e.g., fingerprint scanner) configured to interact with the biometrics module 216 for registering and authenticating one or more biometric identifiers (e.g., fingerprints) of the user. If biometric authentication is enabled, the authentication program 110a, 110b may implement the biometrics module 216 to disable access to the USB HID device 200 as a default. Once the biometrics module 216 reads a valid biometric identifier provided by the user via the onboard biometric scanner, the authentication program 110a, 110b may implement the biometrics module 216 to trigger an output to enable all other modules (e.g., HID driver module 214, matching module 212). Thereafter, the authentication program 110a, 110b may implement the HID driver module 214 to automatically load the USB HID drivers (e.g., device drivers) to enable the user device to identify and interact with the USB HID device 200.

Figure 3:
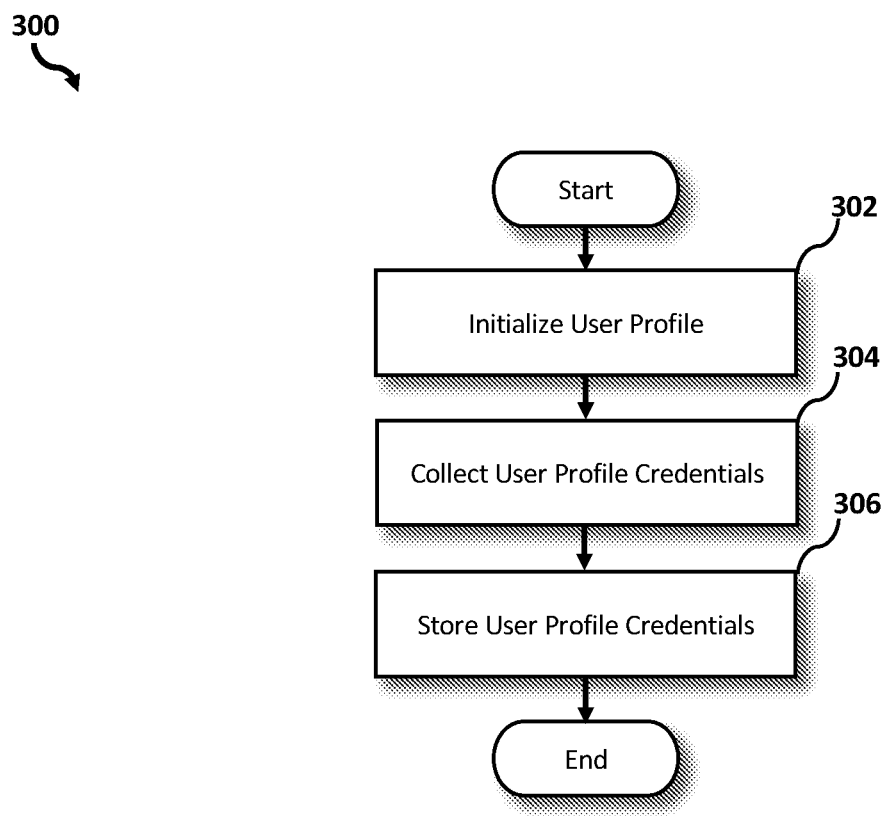
FIG. 3 is an operational flowchart illustrating a process for a user profile registration according to at least one embodiment.
Figure 4:
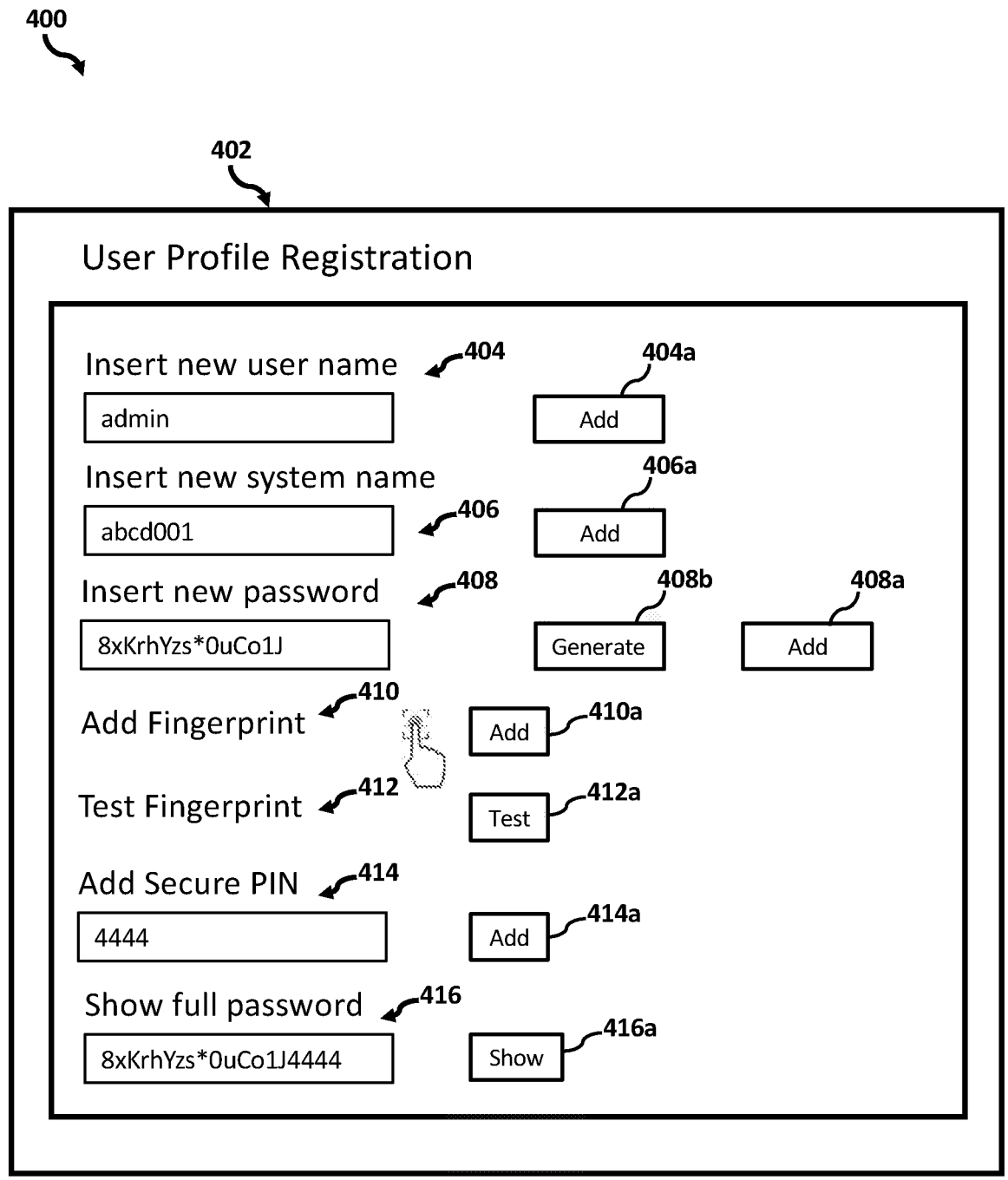
FIG. 4 is an exemplary illustration of a user interface for the user profile registration process depicted in FIG. 3 according to at least one embodiment.

Referring now to FIGS. 3 and 4, an operational flowchart illustrating the exemplary user profile registration process 300 and an exemplary illustration of a user profile registration interface 400 used by the authentication program 110a and 110b according to at least one embodiment are depicted.

At 302, a user profile is initialized. Using a software program 108 running on a user device, for example, a laptop, a smartphone, a tablet, or similar device (e.g., client computer 102), a user profile corresponding with the user of the user device may be initialized. The initialized profile may be a data file for storing one or more user credentials, one or more user preferences, and other relevant data. The user profile may be implemented as a data structure with fields containing user data or pointers to user data. In one embodiment, the user profile may be initialized with the USB HID device 200 (e.g., client computer/microcontroller 102) connected to the user device so that the one or more user profile credentials may be stored in the USB HID device 200.

For example, a user interacts with a user laptop (e.g., client computer 102) and a USB HID device 200 (e.g., client computer/microcontroller 102) connected to the user laptop. The software program 108 running on the user laptop automatically presents the user with an option to create a new profile if none is found or displays a button or other way for the user to indicate a desire to create a new profile. Once the user affirmatively indicates, via clicking a respective button, a desire to create a user profile, a new data structure is initialized for the user profile. The user then starts the authentication program 110a, 110b running on the USB HID device 200 to store the one or more user profile credentials of the initialized user profile in the USB HID device 200.

Next, at 304, user profile credentials are collected. After the user profile is initialized at 302, the authentication program 110a, 110b of the USB HID device 200 may provide, in the user device, a user profile registration interface 400 for collecting the user profile credentials for the new user profile. In one embodiment, the authentication program 110a, 110b may present the user profile registration interface 400 including a dashboard 402. The dashboard 402 may include a user name text field 404 for collecting a new user name, a system name text field 406 for collecting a new system name (e.g., server name, machine name host name, computer name, domain name), and a password text field 408 for collecting a new password associated with the user name and the system name.

In one embodiment, the user may submit the requested credentials by, for example, entering text into the respective text fields (e.g., user name text field 404, system name text field 406, password text field 408). In at least one embodiment, the authentication program 110a, 110b may also provide the user with an option to request a password (e.g., alpha-numeric password) generated by the authentication program 110a, 110b (e.g., via clicking a "Generate" button 408b adjacent the password text field 408).

According to one embodiment, the authentication program 110a, 110b may provide multi-factor authentication for accessing the USB HID device 200 and the user profile credentials stored therein. As part of the multi-factor authentication, the authentication program 110a, 110b may provide the user with an option (e.g., in dashboard 402) to register a biometric identifier (e.g., fingerprint) using an onboard biometric scanner (e.g., fingerprint scanner) of the USB HID device 200 (e.g., via clicking an "Add" button 410a adjacent an "Add Fingerprint" prompt 410). In one embodiment, the authentication program 110a, 110b may also provide the user with an option to test the registered biometric identifier using the biometric scanner of the USB HID device 200 (e.g., via clicking a "Test" button 412a adjacent a "Test Fingerprint" prompt 412). In at least one embodiment, the authentication program 110a, 110b may provide the user with an option to register multiple biometric identifiers (e.g., multiple fingerprints) of the user. In one embodiment, the authentication program 110a, 110b may register the collected biometric identifier in the biometrics module 216 of the USB HID device 200.

As another part of the multi-factor authentication, the authentication program 110a, 110b of the USB HID device 200 may provide the user with an option to submit a secure personal identification number (PIN). In one embodiment, the dashboard 402 may include a secure PIN text field 414 for collecting an optional secure PIN from the user. In one embodiment, the authentication program 110a, 110b may instruct the user (e.g., via a text box adjacent the secure PIN text field 414) to textually enter a short (e.g., four characters), easy to remember alpha-numeric string of characters for the secure PIN. The user may textually enter the secure PIN into the secure PIN text field 414 and may submit the secure PIN via clicking an "Add" button 414a adjacent the secure PIN text field 414. In response to the user adding the secure PIN in the secure PIN text field 414, the authentication program 110a, 110b may concatenate the initially collected password at 408 and the secure PIN collected at 414 to generate a full password. Accordingly, the full password may include a first segment (e.g., a secure string) collected at 408 and a second segment (e.g., secure PIN) collected at 414.

In one embodiment, the authentication program 110a, 110b may present the user with an option to view the full password in the dashboard 402 (e.g., via clicking a "Show" button 416a adjacent a "Show full password" prompt 416). In response, the authentication program 110a, 110b may show the full password concatenating the secure string and the secure PIN.

Continuing with the previous example, after the user interacts with the user laptop to initialize a user profile and start the authentication program 110a, 110b running on the USB HID device 200, the authentication program 110a, 110b directs the user to a dashboard 402 of a user profile registration interface 400. The dashboard 402 presents the user with a user name text field 404, a system name text field 406, and a password text field 408. In response, the user textually enters "admin" into the user name text field 404 and "abcd001" into the system name text field 406. The user then interacts with the user laptop and clicks the "Generate" button 408b adjacent the password text field 408. In response, the authentication program 110a, 110b generates and displays "8xKrhYzs*0uCo1J" in the password text field 408.

The dashboard 402 also presents the user with an "Add fingerprint" prompt 410 to optionally register a user fingerprint. In response, the user clicks an "Add" button 410a adjacent the "Add fingerprint" prompt 410 and interacts with an onboard fingerprint scanner of the USB HID device 200 to scan and register a right index fingerprint of the user in the biometrics module 216. Then, the user clicks a "Test" button 412a adjacent a "Test fingerprint" prompt 412 presented in the dashboard 402 and interacts with the onboard fingerprint scanner of the USB HID device 200 to test the registered right index fingerprint of the user.

The dashboard 402 also presents the user with a secure PIN text field 414 to optionally add a secure PIN as part of the multi-factor authentication of the user profile. In response, the user textually enters "4444" into the secure PIN text field 414 and clicks an "Add" button 414a adjacent the secure PIN text field 414 to submit the secure PIN to the dashboard 402. After the user adds the secure PIN, the authentication program 110a, 110b of the USB HID device 200 concatenates the initially collected password "8xKrhYzs*0uCo1J" at 408 and the subsequently collected secure PIN "4444" at 414 and forms "8xKrhYzs*0uCo1J4444" as the full password for the new user profile. Then, the user clicks a "Show" button 416a adjacent a "Show full password" prompt 416 in the dashboard 402. In response, the authentication program 110a, 110b depicts the full password "8xKrhYzs*0uCo1J4444" in a respective text field of the "Show full password" prompt 416.

Then, at 306, the user profile credentials are stored. After the authentication program 110a, 110b of the USB HID device 200 collects the user profile credentials, the authentication program 110a, 110b may implement the user input module 208 to store the user profile credentials in the user database 210 of the USB HID device 200.

In one embodiment, the authentication program 110a, 110b may provide a respective "Add" button 404a, 406a, 408a adjacent the user name text field 404, system name text field 406, and password text field 408 presented in the dashboard 402. In response to the user entering text into a text field and clicking the respective "Add" button, the user input module 208 may record the entered information into the onboard credential storage matrix (e.g., Table 1) in the user database 210. If the user registers a full password including the secure string (e.g., entered in password text field 408) and the secure PIN (e.g., entered in secure PIN text field 414), the authentication program 110a, 110b may provide the user input module 208 to only store the secure string segment in the credential storage matrix (e.g., Table 1). In one embodiment, the collected biometric identifier may be stored in the biometrics module 216 of the USB HID device 200 in response to the user clicking the "Add" button 410a adjacent the "Add fingerprint" prompt 410.

In one embodiment, the user may manually copy the full password depicted in the text box associated with the "Show full password" prompt 416 (e.g., in dashboard 402) and may interact with the software program 108 on the user device to store the full password locally on the data storage device 106 as part of the locally stored user profile credentials.

In one embodiment, the authentication program 110a, 110b of the USB HID device 200 may provide the user with the option to store the user profile and associated user credentials (e.g., with full password) locally on the data storage device 106 and may provide the user with the option to upload the user profile and associated user credentials (e.g., with full password) to a cloud environment for storage on a server 112, via the communication network 116. On the server 112, the user profile and associated user credentials may be stored within a data repository, such as the database 114.

Accordingly, when the USB HID device 200 is connected to the user device, the authentication program 110a, 110b may implement the HID driver module 214 to automatically inject only the secure string segment of the full password into a password field as will be detailed with reference to FIGS. 5 and 6. Thereafter, the user may manually append (e.g., textually enter) the secure PIN to the secure string to complete the full password. It is contemplated that by providing a password including an automatic segment (e.g., secure string) and a manual segment (e.g., secure PIN), the authentication program 110a, 110b running in the USB HID device 200 may provide multi-factor authentication for accessing the USB HID device 200 and the user profile credentials stored therein.

Continuing with the previous example, after the user enters the user name "admin," the system name "abcd001," and the secure string segment of the password "8xKrhYzs*0uCo1J" in the respective text fields 404, 406, 408 in the dashboard 402, the user clicks the respective "Add" buttons 404a, 406a, and 408a. In response, the authentication program 110a, 110b of the USB HID device 200 implements the user input module 208 of the USB HID device 200 to record the collected user profile credentials in the credential storage matrix in the user database 210. Further, the user clicks the "Add" button 410a adjacent the "Add fingerprint" prompt 410 to store the fingerprint of the user in the biometrics module 216 of the USB HID device 200.

Thereafter, the user manually copies the full password "8xKrhYzs*0uCo1J4444" from the text box associated with the "Show full password" prompt 416 and interacts with the software program 108 on the user laptop to store the full password locally on the data storage device 106 as part of the locally stored user profile credentials.

Figure 5:
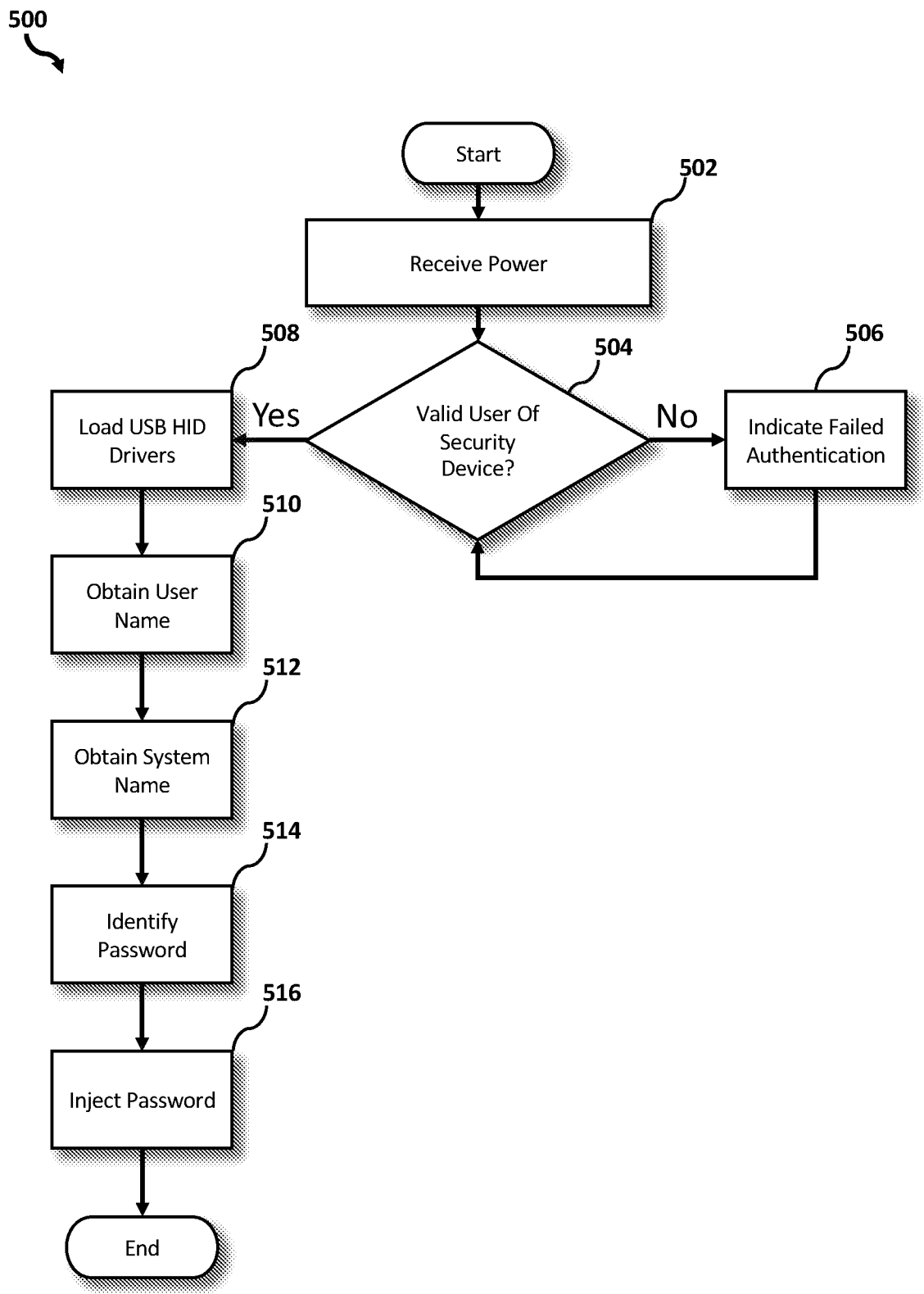
FIG. 5 is an operational flowchart illustrating a user authentication process according to at least one embodiment.
Figure 6:
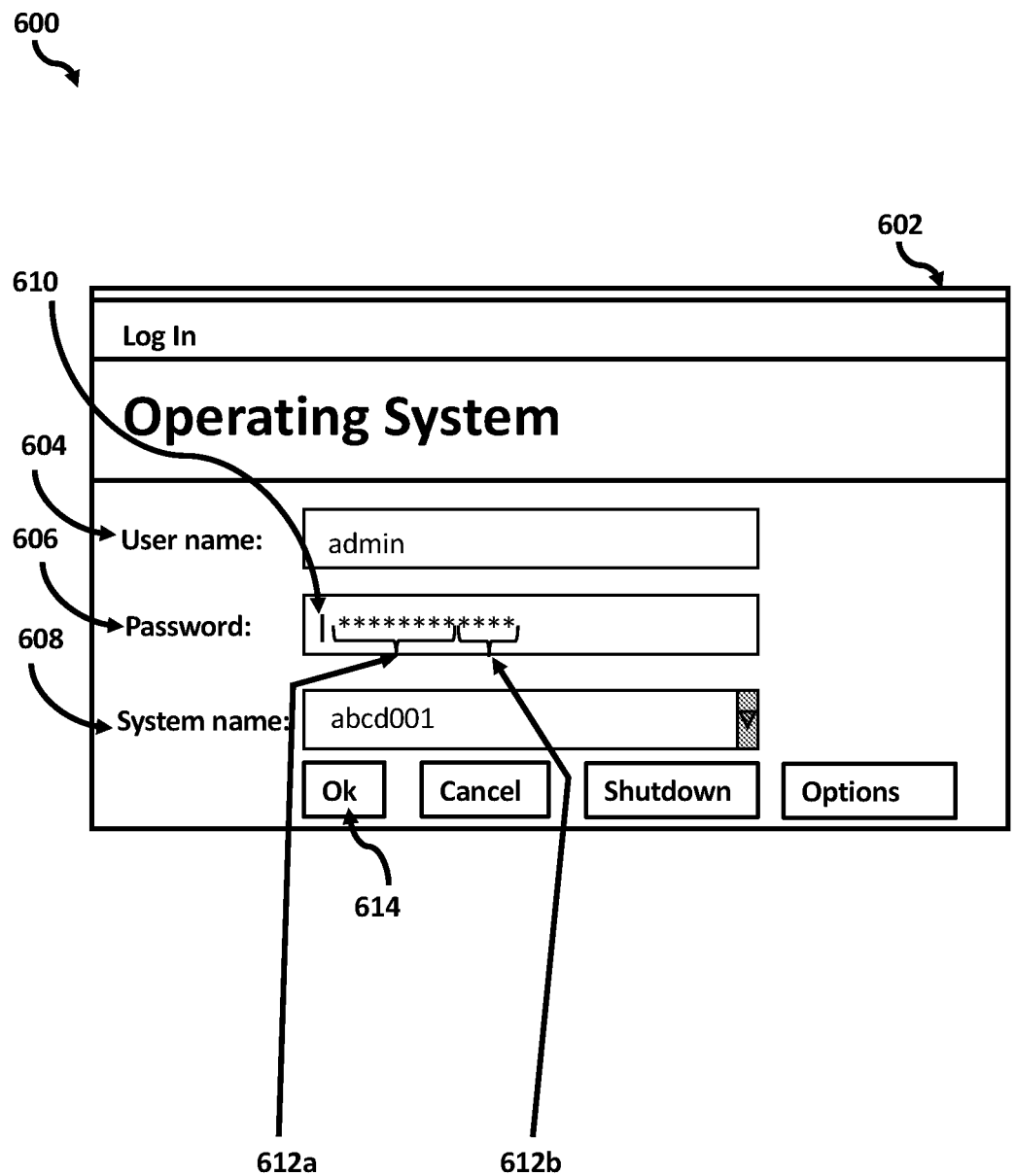
FIG. 6 is an exemplary illustration of a user interface for the user authentication process depicted in FIG. 5 according to at least one embodiment.

Referring now to FIGS. 5 and 6, an operational flowchart illustrating the exemplary user authentication process 500 used by the authentication program 110a, 110b of the USB HID device 200 and an exemplary illustration of a login interface 600 according to at least one embodiment are depicted.

At 502, power is received. A user device (e.g., client computer 102) running a software program 108 may approach a login screen 602 of a login interface 600 in response to a user interaction with the user device. In one embodiment, the user may interact with the user device and approach the login screen 602 for an operating system (OS) or any application/platform requiring user authentication. The user device may provide one or more login prompts on the login screen 602 by presenting the user with text fields for entering one or more user credentials. In one embodiment, the login screen 602 provided by the user device may include a user name text field 604, a password text field 606, and a system name text field 608 for a system name (e.g., server name, machine name, host name, computer name, domain name). In response, the user may textually enter the user name associated with the user profile in the user name text field 604 and may textually enter the system name associated with the user device in the system name text field 608. Then, the user may interact with the user device to place a text insertion point 610 (e.g., text cursor) in the password text field 606 (e.g., via interacting with a keyword or a mouse of the user device).

Thereafter, the user may connect the plug 204 of the USB HID device 200 to a respective port (e.g., USB port) of the user device. Once the USB HID device 200 is plugged into the user device, the USB HID device 200 may draw power from the user device via the respective port of the user device. With power received from the user device, the USB HID device 200 may be activated to run the authentication program 110a, 110b included in the USB HID device 200.

Continuing with the previous example, the user powers on the user laptop and approaches the login screen 602 for the OS running on the user laptop. On the login screen 602, the user laptop provides a user name text field 604, a password text field 606, and a system name text field 608. In response, the user textually enters "admin" into the user name text field 604 and "abcd001" into the system name text field 608. Then, the user interacts with the mouse of the user laptop to move the text cursor 610 into the password text field 606. Thereafter, the user plugs in the USB HID device 200 into a USB port of the user laptop such that the USB HID device 200 receives power from the user laptop via the USB port and the authentication program 110a, 110b is activated to run in the USB HID device 200.

Then, at 504, the authentication program 110a, 110b determines if the user is a valid user of the USB HID device 200. If the biometric authentication functionality is enabled at 304 of the user profile registration process 300, the biometrics module 216 of the USB HID device 200 may initially, in a default mode, disable access to the USB HID drivers (e.g., device drivers) in the HID driver module 214, until the biometrics module 216 reads a valid biometric identifier provided from the user via the onboard biometric scanner of the USB HID device 200.

With the biometric authentication function enabled, the authentication program 110a, 110b may activate the biometrics module 216 to emit a light (e.g., red light) from a light-emitting diode (LED) of the USB HID device 200 to indicate that the USB HID device 200 is energized but not yet validated to the user. In response, the user may provide the biometric identifier (e.g., fingerprint) via the biometric scanner (e.g., fingerprint scanner) of the USB HID device 200. Thereafter, the authentication program 110a, 110b of the USB HID device 200 may implement the biometrics module 216 to compare the biometric identifier received from the user via the biometric scanner with the biometric identifier registered in the biometrics module 216 during the user profile registration process 300.

Continuing with the previous example, the authentication program 110a, 110b of the USB HID device 200 determines that biometric authentication was enabled at 304 of the user profile registration process 300. As such, the authentication program 110a, 110b activates the biometrics module 216 to emit a red light from the LED of the USB HID device 200 and initially disables access to the USB HID drivers in the HID driver module 214. In response, the user interacts with the onboard fingerprint scanner of the USB HID device 200 to provide a fingerprint scan of the user. Thereafter, the biometrics module 216 of the USB HID device 200 compares the fingerprint received from the user via the onboard fingerprint scanner with the fingerprint that was registered in the biometrics module 216 during the user profile registration process 300.

If the biometrics module 216 determines that the biometric identifier received from the user via the biometric scanner of the USB HID device 200 does not match with the registered (e.g., in the biometrics module 216) biometric identifier at 504, then the authentication program 110a, 110b of the USB HID device 200 determines that the user is not a valid user of the USB HID device 200 and indicates the failed authentication at 506. In one embodiment, the biometrics module 216 may visually indicate the failed authentication to the user with the LED of the USB HID device 200 continuing to emit the light (e.g., red light) indicative of a not yet validated user. Without receiving the registered biometric identifier from the user at 504, the biometrics module 216 may not activate the HID driver module 214 to load the USB HID drivers. As such, the passwords stored in the user database 210 of the USB HID device 200 may not be injected into the user device.

In one embodiment, after receiving the indication of failed authentication at 506 (e.g., red light from LED), the user may perform another attempt to provide a valid biometric identifier via the biometric scanner of the USB HID device 200. Thereafter, the authentication program 110a, 110b of the USB HID device 200 may return to 504 and implement the biometrics module 216 to determine if the user is the valid user of the USB HID device 200. In one embodiment, after a pre-defined number of attempted validations (e.g., three attempts), the biometrics module 216 may lock-out or prevent the user from attempting to validate the USB HID device 200 for a pre-defined period of time (e.g., 30 minutes). In at least one embodiment, the user may need to disconnect and reconnect the USB HID device 200 to the user device after the pre-defined number of attempted validations.

Continuing with the previous example, an unauthorized user attempts to use the USB HID device 200 of an authorized user to log in to the laptop of the authorized user. The unauthorized user interacts with the fingerprint scanner of the USB HID device 200 and provides a right index fingerprint of the unauthorized user. The biometrics module 216 of the USB HID device 200 compares the provided right index fingerprint of the unauthorized user with the right index fingerprint of the authorized user registered in the biometrics module 216. Based on the comparison of the right index fingerprint of the unauthorized user with the registered right index fingerprint of the authorized user, the biometrics module 216 determines that the unauthorized user is not a valid user of the USB HID device 200. Due to the failed authentication, the biometrics module 216 does not trigger the HID driver module 214 to load the USB HID drivers and the unauthorized user is unable to access the stored user credentials of the authorized user. Further, the LED of the USB HID device 200 continues to emit the red light to indicate that the user is not a validated user.

If, however, the biometrics module 216 determines that the biometric identifier received from the user via the biometric scanner of the USB HID device 200 matches with the registered (e.g., in the biometrics module 216) biometric identifier at 504, then the authentication program 110a, 110b of the USB HID device 200 determines that the user is a valid user of the USB HID device 200 and implements the biometrics module 216 to trigger the HID driver module 214 to load the USB HID drivers (e.g., device drivers) at 508. In one embodiment, the biometrics module 216 may also trigger the LED of the USB HID device 200 to emit a different light (e.g., green light) to visually indicate that the user is a valid user of the USB HID device 200.

Once the USB HID drivers are loaded, the user device may detect the USB HID device 200. Specifically, the USB HID drivers of the HID driver module 214 may interface with one or more native USB HID drivers (e.g., generic device drivers) loaded as a standard in the user device to identify and interact with the USB HID device 200. In one embodiment, the user device may recognize or register the USB HID device 200 as a keyboard of the user device. As such, the HID driver module 214 may be enabled to automatically inject a keystroke payload including, for example, a password into the password text field 606 of the login screen 602, similar to a manual keyboard entry.

Continuing with the previous example, the user interacts with the fingerprint scanner of the USB HID device 200 and provides a right index fingerprint of the user. The biometrics module 216 of the USB HID device 200 compares the provided right index fingerprint of the user with the right index fingerprint of the user registered in the biometrics module 216. Based on the comparison of the right index fingerprint received from the user with the registered right index fingerprint of the user, the biometrics module 216 determines that the user is a valid user of the USB HID device 200. The biometrics module 216 triggers the LED of the USB HID device 200 to emit a green light to visually indicate the successful validation of the user to the USB HID device 200. Further, the biometrics module 216 triggers the HID driver module 214 to load the USB HID drivers. In response, the user laptop detects the USB HID device 200 connected to the user laptop. Further, the user laptop registers the USB HID device 200 as a keyboard of the user laptop.

Then, at 510, the user name is obtained. The authentication program 110a, 110b of the USB HID device 200 may query the user device (e.g., via executing a script) to obtain the user name associated with the user of the user device. In one embodiment, the authentication program 110a, 110b may implement the matching module 212 to read the user name manually entered (e.g., via keyboard) by the user in the user name text field 604 of the login screen 602. In response, the user device may transmit the user name to the USB HID device 200 so that the matching module 212 may identify the associated password in the user database 210.

Continuing with the previous example, after the user laptop recognizes the USB HID device 200, the matching module 212 of the USB HID device 200 reads the user name manually entered by the user in the user name text field 604 of the login screen 602. Thereafter, the matching module 212 obtains the user name "admin" from the user name text field 604.

Then, at 512, the system name is obtained. The authentication program 110a, 110b of the USB HID device 200 may query the user device to obtain the system name (e.g., server name, machine name, host name, computer name, domain name) associated with the user device of the user. Specifically, the authentication program 110a, 110b of the USB HID device 200 may generate and execute a script to access and obtain the system name from the user device. In one embodiment, the executed script may include Visual Basic Script (VBScript) or any other suitable scripting language (e.g., JavaScript). In response to the query performed by the authentication program 110a, 110b of the USB HID device 200, the user device may provide the system name in the system name text field 608 of the login screen 602 and may transmit the system name of the user device to the USB HID device 200. In at least one embodiment, if the system name was manually entered (e.g., via keyboard) by the user in the system name text field 608 of the login screen 602, the matching module 212 may obtain the system name by reading the manually entered system name in the system name text field 608.

Continuing with the previous example, the authentication program 110a, 110b of the USB HID device 200 generates and executes a VBScript to query the user laptop for the system name associated with the user laptop. In response, the user laptop provides the system name "abcd001" in the system name text field 608 and transmits the system name "abcd001" to the USB HID device 200.

Then, at 514, the password is identified. After the user name is obtained at 510 and the system name is obtained at 512, the authentication program 110a, 110b of the USB HID device 200 may generate and execute a script to cross reference the onboard credential storage matrix (e.g., Table 1) in the user database 210 to identify the associated password. In one embodiment, the executed script may include the following code snippet [1]:

if username=user_name and systemname=pc_name
  then Inject secure password string          [1]

As a result of executing the code snippet [1], the matching module 212 may read through the one or more user names and the one or more system names stored in the onboard credential storage matrix (e.g., Table 1) and identify the user name and the system name obtained from the user device. Then, the matching module 212 may identify the password by associating the user name and the system name with the password recorded in the onboard credential storage matrix (e.g., Table 1) in the user database 210. In one embodiment, if the user created a full password (e.g., secure string and secure PIN) during the user profile registration process 300, the matching module 212 may identify the secure string of the password by associating the user name and the system name with the secure string of the password recorded in the onboard credential storage matrix.

Continuing with the previous example, the authentication program 110a, 110b of the USB HID device 200 executes a script to cross reference the onboard credential storage matrix in the user database 210 to identify the password associated with the obtained user name "admin" and the obtained system name "abcd001." Specifically, the authentication program 110a, 110b executes a script including, in part, the code snippet [1] detailed above. As a result of the executed script, the matching module 212 reads through the onboard credential storage matrix and identifies the user name "admin" and the system name "abcd001" recorded in the onboard credential storage matrix. Thereafter, the matching module 212 identifies the associated secure string of the password "8xKrhYzs*0uCo1J" recorded in the onboard credential storage matrix.

Then, at 516, the password is injected. Once the matching module 212 identifies the password (e.g., secure string of the password) associated with the user name and the system name in the onboard credential storage matrix of the user database 210, the code snippet [1], detailed above, may implement the HID driver module 214 to transmit the identified password as a keystroke payload into the password text field 606 in the login screen 602. In one embodiment, the keystroke payload may be directed into the password text field 606 by the text insertion point 610 (e.g., text cursor) positioned therein by the user. In one embodiment, the HID driver module 214 of the USB HID device 200 may detect the text insertion point 610 in the password text field 606 and may automatically inject or deliver a secure string of the password 612a following the text insertion point 610 positioned in the password text field 606.

In one embodiment, the HID driver module 214 may provide a pre-programmed delay (e.g., three seconds) before automatically injecting the secure string of the password 612a into the password text field 606. In at least one embodiment, the pre-programmed delay may be adjusted by the user during the user profile registration process 300. In one embodiment, the USB HID device 200 may be disconnected from the user device after the secure string of the password 612a is injected into the password text field 606.

Thereafter, if the user created a secure PIN during the user profile registration process 300, the user may manually enter a secure PIN 612b into the password text field 606. Specifically, the user may textually enter (e.g., via keyboard) the secure PIN 612b into the password text field 606 following the last character of the automatically injected secure string of the password 612a. Then, the user may interact with the user device to affirmatively instruct the user device to execute the login sequence. In response, the software program 108 running in the user device may cross-reference the entered user profile credentials with the user profile credentials stored in the user device (e.g., local data storage device 106). After determining that the entered user profile credentials match with the user profile credentials stored in the user device, the user device may complete the login sequence and provide the user with access to the system.

Continuing with the previous example, after the matching module 212 identifies the secure string of the password "8xKrhYzs*0uCo1J" associated with the user name "admin" and the system name "abcd001" in the onboard credential storage matrix of the user database 210, the HID driver module 214 injects "8xKrhYzs*0uCo1J" as the secure string of the password 612a following the text insertion point 610 positioned in the password text field 606. Then, the user interacts with the user laptop and textually enters "4444" as the secure PIN 612b after the last character "J" of the newly injected secure string of the password 612a in the password text field 606. Thereafter, the user interacts with the user laptop to click the "Ok" button 614 in the login screen 602 to execute the login sequence. After determining that the entered user profile credentials (user name: admin; password: 8xKrhYzs*0uCo1J4444; system name: abcd001) match with the user profile credentials stored locally in the user laptop, the user laptop executes the login and provides the user with access to the system.

As described herein, the USB HID device 200 running the authentication program 110a, 110b may have the capacity to improve the technical field of authentication technology by providing a user-friendly mechanism for secure, multi-account, multi-system authentication that is compatible with any system without required proprietary software. By implementing USB HID drivers that are prevalent as standard with all modern operating systems, the USB HID device 200 may work seamlessly across virtually all hardware and operating system configurations. The functionality of the USB HID device 200 does not require proprietary software to be resident and running in the user device. As such, the USB HID device 200 may be implemented to automatically inject power-on or BIOS level passwords before the start of any operating system in the user device.

Further, the USB HID device 200 may store a portfolio of user ID/password (e.g., up to 1000 characters for each password) combinations for multiple systems associated with the user. The USB HID device 200 may execute a script to cross reference an onboard credential storage matrix and automatically identify a password associated with a particular user ID and system. Then, the USB HID device 200 may execute a script to automatically inject the identified password into a password field during a login sequence of the user device. In one embodiment, the USB HID device 200 may implement optional multi-factor authentication by requiring biometric authentication for enabling the USB HID device 200. In another embodiment, the USB HID device 200 may implement optional multi-factor authentication by automatically injecting only a first segment of a full password and requiring the user to manually enter a second segment to complete the full password. Thus, the USB HID device 200 running the authentication program 110a, 110b may improve the functionality of a computer.

It may be appreciated that FIGS. 2 to 6 provide only an illustration of one embodiment and do not imply any limitations with regard to how different embodiments may be implemented. Many modifications to the depicted embodiment(s) may be made based on design and implementation requirements.

Figure 7:
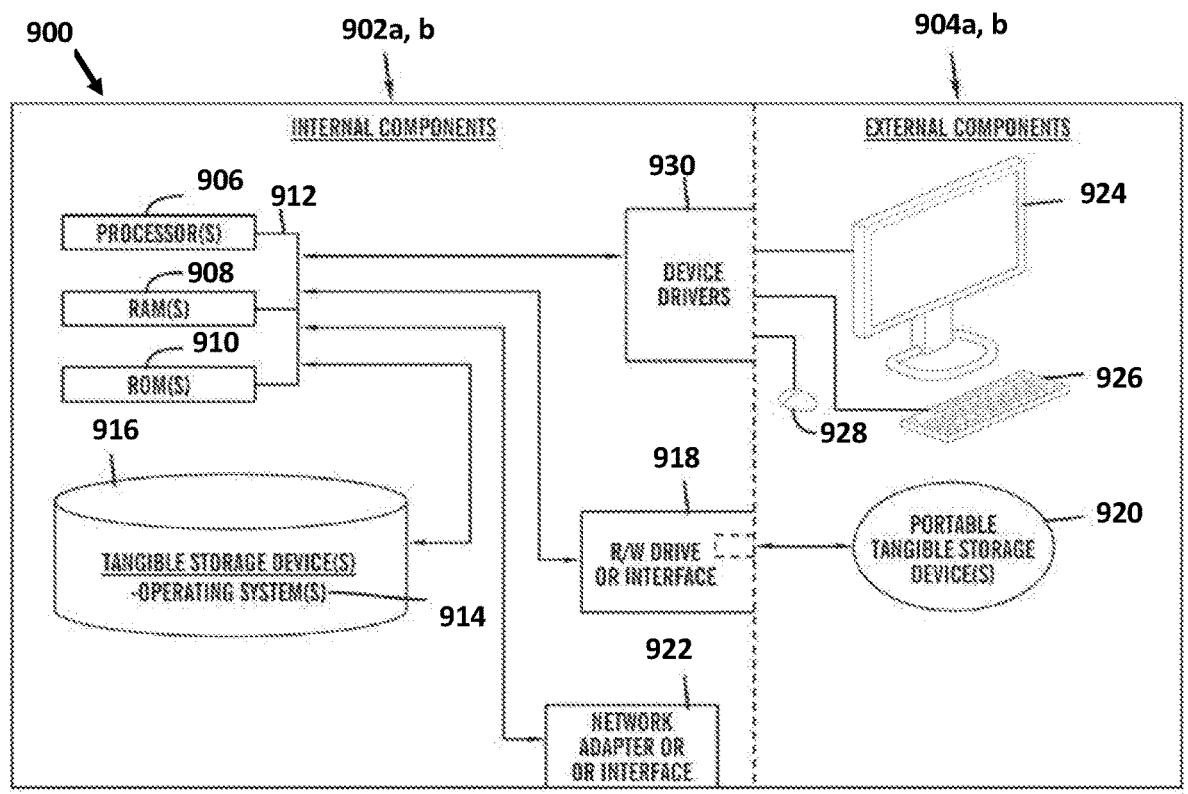
FIG. 7 is a block diagram of internal and external components of computers and servers depicted in FIG. 1 according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 7. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the authentication program 110a in client computer 102, and the authentication program 110b in network server 112, may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the authentication program 110a and 110b can be stored on one or more of the respective portable computer-readable tangible storage devices 920, read via the respective R/W drive or interface 918, and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the authentication program 110a in client computer 102 and the authentication program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the authentication program 110a in client computer 102 and the authentication program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
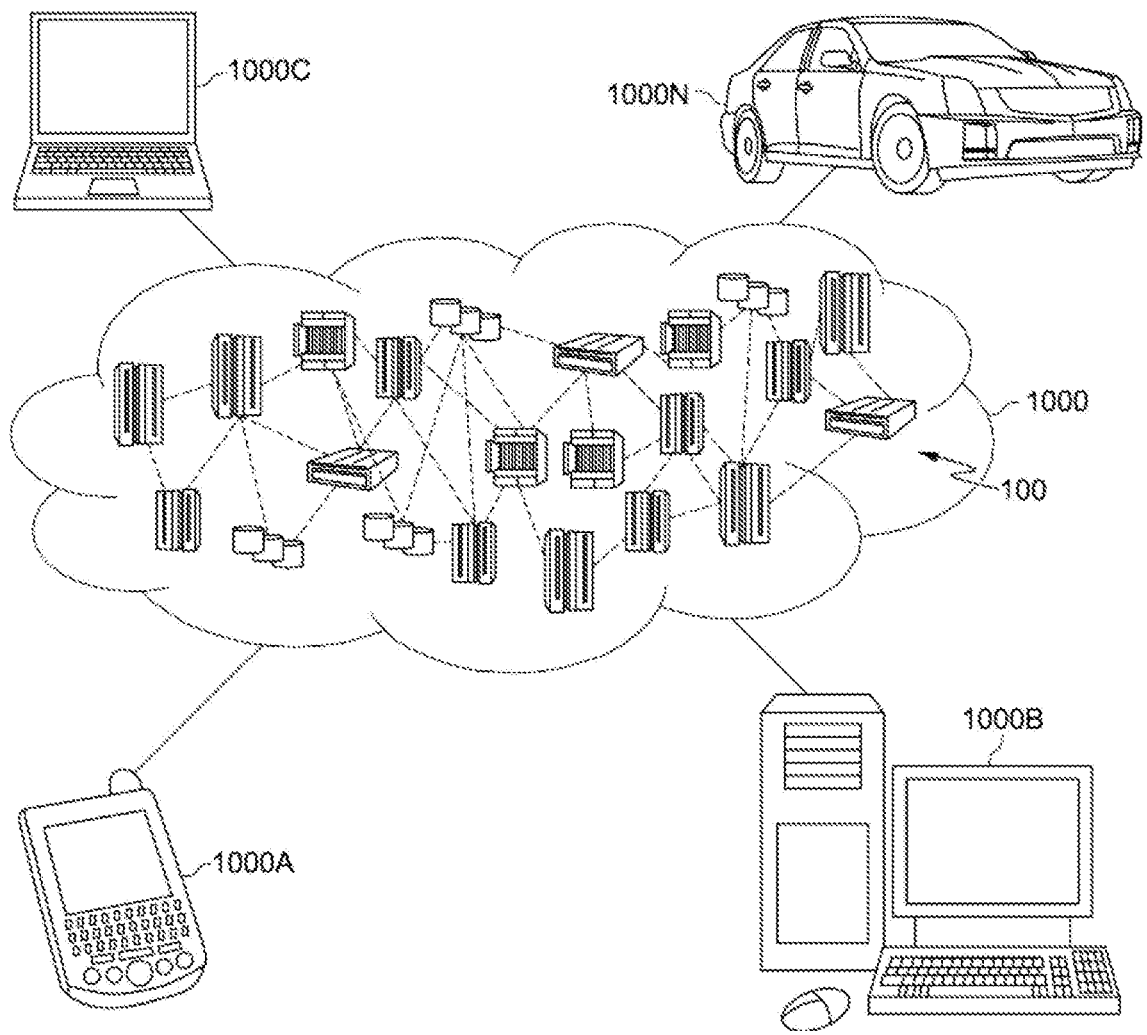
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 8 are intended to be illustrative only and that computing nodes 100 and cloud computing environment 1000 can communicate with any type of computerized device over any type of network and/or network addressable connection (e.g., using a web browser).

Figure 9:
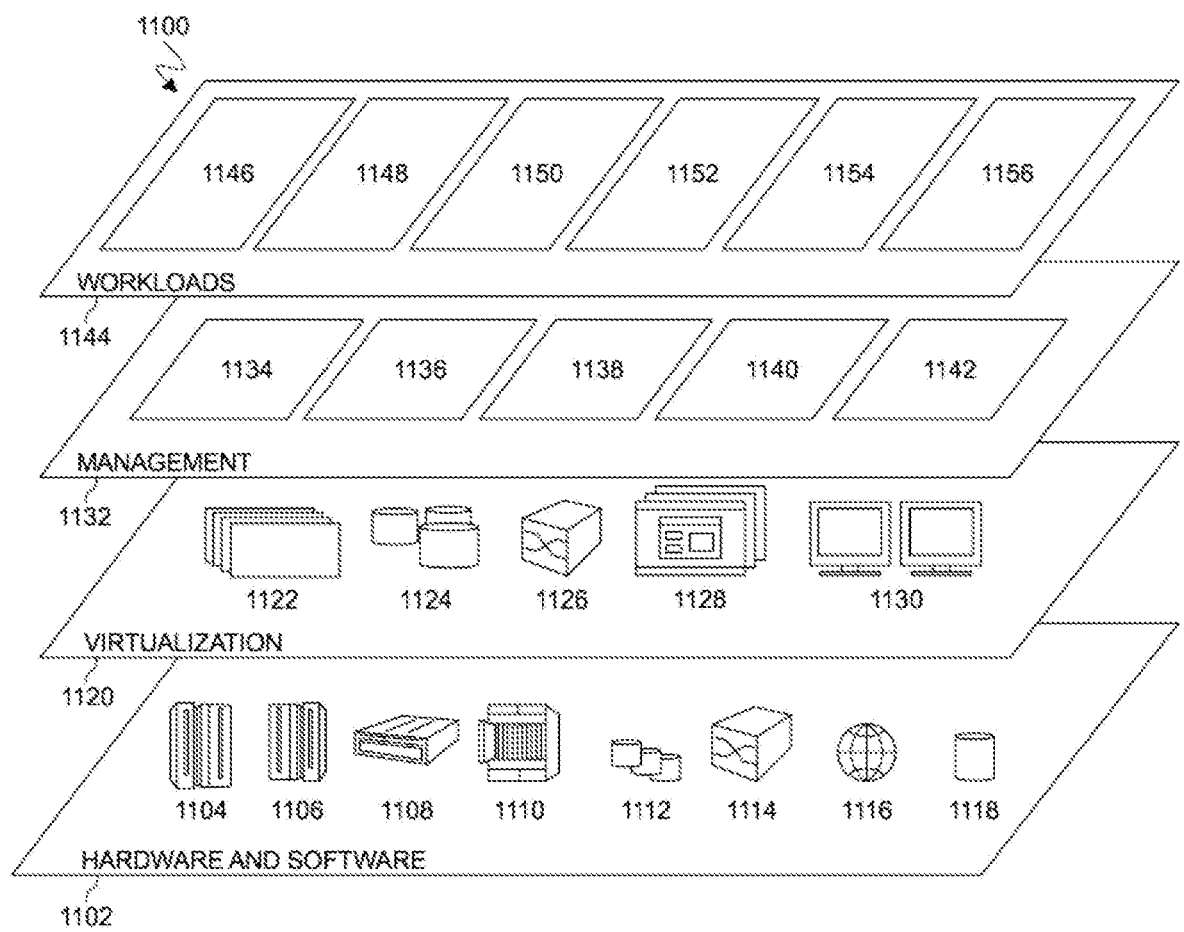
FIG. 9 is a block diagram of functional layers of the illustrative cloud computing environment of FIG. 8, in accordance with an embodiment of the present disclosure.

Referring now to FIG. 9, a set of functional abstraction layers 1100 provided by cloud computing environment 1000 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124;

virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and authentication processing 1156. A authentication program 110a, 110b provides a way to securely authenticate a user across multiple systems and user IDs, associated with the user, using a single security device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for an enhanced user authentication, the method comprising:
obtaining, from a user device by a security device in physical communication with the user device, a user name associated with the user device;
obtaining, from the user device by the security device in physical communication with the user device, a system name associated with the user device;
identifying, in an onboard database of the security device in physical communication with the user device, a password associated with the obtained user name and the obtained system name; and
in response to a login prompt of the user device, automatically injecting the identified password from the security device in physical communication with the user device into the login prompt.

2. The method of claim 1, wherein automatically injecting the identified password from the security device in physical communication with the user device into the login prompt further comprises:

detecting a text cursor provided in a password text field in the login prompt of the user device; and
delivering the injected password to the password text field in response to detecting the text cursor provided in the password text field.

3. The method of claim 1, further comprising:
loading at least one device driver of the security device in response to receiving power to the security device;
interfacing the loaded at least one device driver of the security device with at least one generic device driver running on the user device; and
identifying the security device as a keyboard component of the user device.

4. The method of claim 1, further comprising:
receiving a user biometric identifier via a biometric scanner of the security device;
comparing the received user biometric identifier with a registered user biometric identifier stored in the security device;
in response to matching the received user biometric identifier with the registered user biometric identifier stored in the security device, determining that the user is a valid user of the security device; and
in response to determining that the user is the valid user of the security device, enabling the security device to be recognized as a keyboard component of the user device.

5. The method of claim 1, further comprising:
storing, using a user input module, a plurality of user names associated with a user in the onboard database of the security device;
storing, using the user input module, a plurality of system names associated with the plurality of stored user names in the onboard database of the security device;
storing, using the user input module, a plurality of passwords associated with the plurality of stored user names and the plurality of stored system names in the onboard database of the security device; and
generating a credential storage matrix in the onboard database of the security device including a respective combination of the plurality of stored user names, the plurality of stored system names, and the plurality of stored passwords.

6. The method of claim 1, wherein in response to the login prompt of the user device, automatically injecting the identified password from the security device in physical communication with the user device, further comprises:
transmitting a first segment of a full password as a keystroke payload from the security device to a password text field of the login prompt, wherein the full password includes the transmitted first segment and a second segment configured to be manually entered into the password text field appending the transmitted first segment of the full password.

7. The method of claim 1, further comprising:
disabling, in a default mode, a human interface device (HID) driver module of the security device in response to receiving power to the security device;
enabling the disabled HID driver module in response to validating a user fingerprint using a biometrics module of the security device;
loading at least one Universal Serial Bus (USB) HID device driver from the enabled HID driver module of the security device;
identifying the security device in physical communication with the user device using an interface between the loaded at least one USB HID device driver of the security device and at least one generic HID device driver running on the user device; and registering the identified security device as a keyboard component of the user device, wherein the HID driver module of the registered security device is configured to provide the automatically injected password as a keystroke payload from the registered security device to the user device.

8. The method of claim 1, further comprising:

in response to determining, using an onboard biometrics module, a valid user fingerprint, executing a first script in the security device to query the user device for the user name associated with the user device, wherein the user name is manually provided for the login prompt of the user device in an operating system login;

executing a second script in the security device to query the user device for the system name associated with the user device;

executing a third script in the security device to cross reference the obtained user name and the obtained system name in a credential storage matrix of the onboard database of the security device; and in response to the executed third script in the security device, determining the password for the operating system login.

9. The method of claim 1, wherein the login prompt is selected from the group consisting of an operating system login prompt, a web application login prompt, a cloud application login prompt, a database login prompt, a remote connection login prompt, and a point of sale system login prompt.

10. The method of claim 5, further comprising:

comparing, using a matching module of the security device, the obtained user name against the plurality of stored user names in the generated credential storage matrix in the onboard database to identify a matching user name in the generated credential storage matrix;

comparing, using the matching module of the security device, the obtained system name against the plurality of stored system names in the generated credential storage matrix in the onboard database to identify a matching system name in the generated credential storage matrix; and associating, using the matching module of the security device, the matching user name and the matching system name identified in the generated credential storage matrix with a matching password from the plurality of stored passwords in the generated credential storage matrix in the onboard database.

11. A computer system for an enhanced user authentication, comprising:

one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

obtaining, from a user device by a security device in physical communication with the user device, a user name associated with the user device;

obtaining, from the user device by the security device in physical communication with the user device, a system name associated with the user device;

identifying, in an onboard database of the security device in physical communication with the user device, a password associated with the obtained user name and the obtained system name; and in response to a login prompt of the user device, automatically injecting the identified password from the security device in physical communication with the user device into the login prompt.

12. The computer system of claim 11, wherein automatically injecting the identified password from the security device in physical communication with the user device into the login prompt further comprises:

detecting a text cursor provided in a password text field in the login prompt of the user device; and delivering the injected password to the password text field in response to detecting the text cursor provided in the password text field.

13. The computer system of claim 11, further comprising:

loading at least one device driver of the security device in response to receiving power to the security device;

interfacing the loaded at least one device driver of the security device with at least one generic device driver running on the user device; and identifying the security device as a keyboard component of the user device.

14. The computer system of claim 11, further comprising:

receiving a user biometric identifier via a biometric scanner of the security device;

comparing the received user biometric identifier with a registered user biometric identifier stored in the security device;

in response to matching the received user biometric identifier with the registered user biometric identifier stored in the security device, determining that the user is a valid user of the security device; and in response to determining that the user is the valid user of the security device, enabling the security device to be recognized as a keyboard component of the user device.

15. The computer system of claim 11, further comprising:

storing, using a user input module, a plurality of user names associated with a user in the onboard database of the security device;

storing, using the user input module, a plurality of system names associated with the plurality of stored user names in the onboard database of the security device;

storing, using the user input module, a plurality of passwords associated with the plurality of stored user names and the plurality of stored system names in the onboard database of the security device; and generating a credential storage matrix in the onboard database of the security device including a respective combination of the plurality of stored user names, the plurality of stored system names, and the plurality of stored passwords.

16. The computer system of claim 11, wherein in response to the login prompt of the user device, automatically injecting the identified password from the security device in physical communication with the user device, further comprises:

transmitting a first segment of a full password as a keystroke payload from the security device to a password text field of the login prompt, wherein the full password includes the transmitted first segment and a second segment configured to be manually entered into the password text field appending the transmitted first segment of the full password.

17. The computer system of claim 11, further comprising:
disabling, in a default mode, a human interface device (HID) driver module of the security device in response to receiving power to the security device;
enabling the disabled HID driver module in response to validating a user fingerprint using a biometrics module of the security device;
loading at least one Universal Serial Bus (USB) HID device driver from the enabled HID driver module of the security device;
identifying the security device in physical communication with the user device using an interface between the loaded at least one USB HID device driver of the security device and at least one generic HID device driver running on the user device; and
registering the identified security device as a keyboard component of the user device, wherein the HID driver module of the registered security device is configured to provide the automatically injected password as a keystroke payload from the registered security device to the user device.

18. A computer program product for an enhanced user authentication, comprising:
one or more computer-readable tangible storage media and program instructions stored on at least one of the one or more computer-readable tangible storage media, the program instructions executable by a processor to cause the processor to perform a method comprising:
obtaining, from a user device by a security device in physical communication with the user device, a user name associated with the user device;
obtaining, from the user device by the security device in physical communication with the user device, a system name associated with the user device;
identifying, in an onboard database of the security device in physical communication with the user device, a password associated with the obtained user name and the obtained system name; and
in response to a login prompt of the user device, automatically injecting the identified password from the security device in physical communication with the user device into the login prompt.

19. The computer program product of claim 18, wherein automatically injecting the identified password from the security device in physical communication with the user device into the login prompt further comprises:
detecting a text cursor provided in a password text field in the login prompt of the user device; and
delivering the injected password to the password text field in response to detecting the text cursor provided in the password text field.

20. The computer program product of claim 18, further comprising:
loading at least one device driver of the security device in response to receiving power to the security device;
interfacing the loaded at least one device driver of the security device with at least one generic device driver running on the user device; and
identifying the security device as a keyboard component of the user device.

\* \* \* \* \*